April 1, 1941.  D. A. SALVETTI  2,236,839
UNIVERSAL JOINT
Filed March 30, 1940
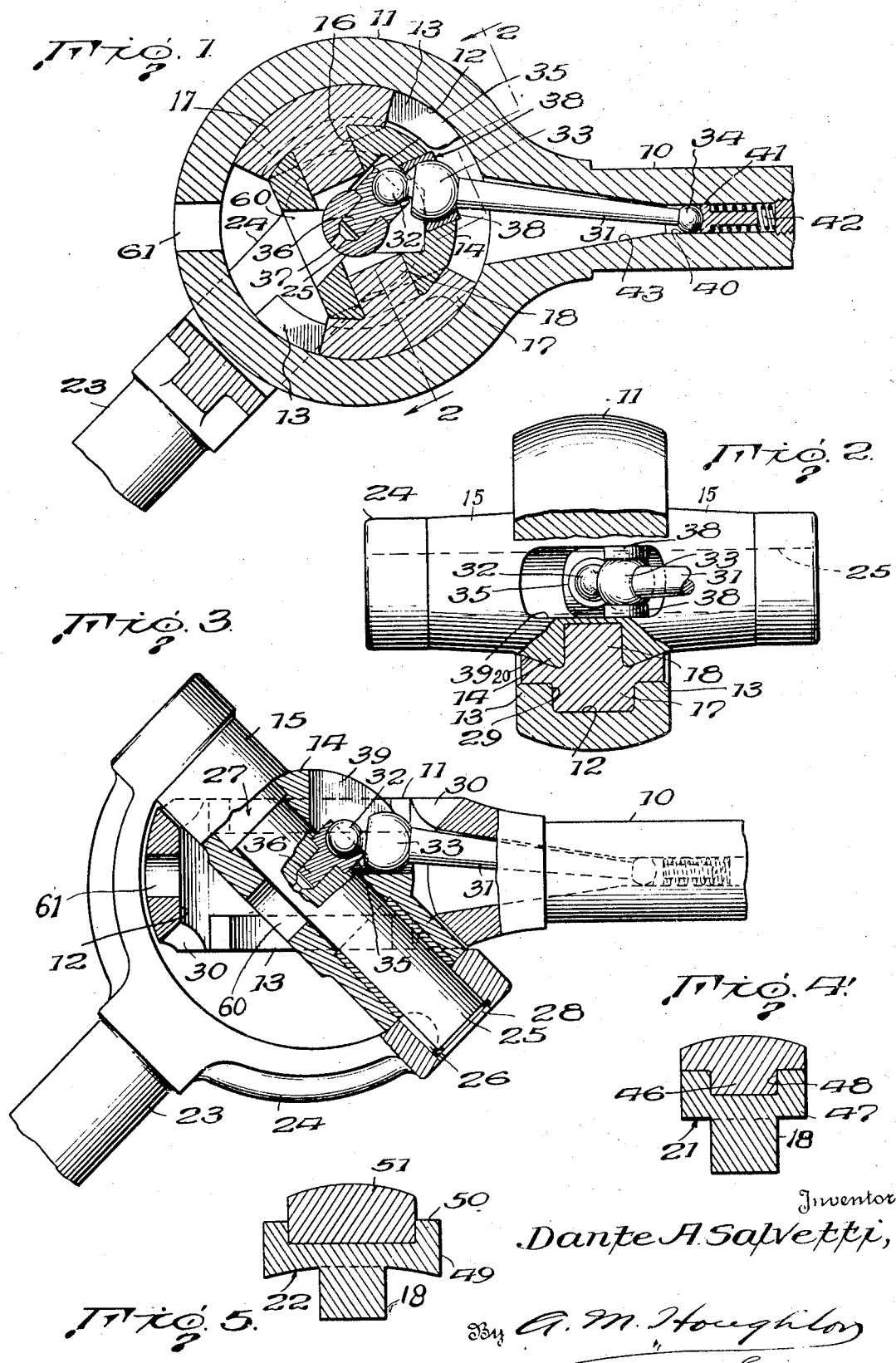

Patented Apr. 1, 1941

2,236,839

UNITED STATES PATENT OFFICE 2,236,839

UNIVERSAL JOINT

Dante A. Salvetti, Blawnox, Pa., assignor of one-third to William G. Darrall, Springdale, Pa.

Application March 30, 1940, Serial No. 326,938

5 Claims. (Cl. 64—21)

This invention or discovery relates to universal joints; and it comprises a constant-velocity universal joint or flexible coupling, including a rotary shaft member having a continuous ring portion a diameter of which coincides with the axis of rotation of said member, a block having shoe means engaging the periphery of the ring so as to be rotated by rotation of the ring about said diameter, a second rotary shaft member having a yoke portion pivotally engaging the block at two sides thereof about an axis at right angles to the axis of said shoe means, and lever means fulcrumed in the first shaft member, the block and a point on the axis of the second shaft member, for keeping the axis of the shoe means in substantially bisecting relation to the axes of rotation of the two shaft members; all as more fully hereinafter set forth and as claimed.

In a prior and copending application Serial No. 300,664, filed Oct. 21, 1939, now Patent No. 2,211,388 for Universal joints, I have disclosed and claimed an improved universal joint or flexible coupling of the constant velocity type, which comprises so to speak a block-and-pin type joint within a block-and-shoe type joint in concentric arrangement, the same block being utilized for both joints, and radius rod means for maintaining the several parts of the joint in proper angular relation for obtaining constant angular velocity for the driving and driven shaft members, even with wide departures from straight alinement of the driving and driven members. The shoes of the outer joint operate in a C-shaped race, the axis of symmetry of which coincides with that of one shaft member, and the block is in pivotal relation to the other shaft member.

Among the objects of the presesnt invention are the provision of an improved joint of the character described, capable of efficient operation even under extreme conditions of load and shock; the provision of a constant velocity joint capable of working efficiently through large angles of disalinement; and the provision of a joint of the character described in which all relatively movable parts are effectively protected against premature wear.

The present invention relates to improvements in joints of this character, improved as to strength and ease of manufacture by a modification of the several parts of the joint; more particularly by making the shoe race in the form of a complete uninterrupted annulus. This construction gives great strength, and moreover it makes possible the simple construction of joints capable of working through extraordinarily large angles of disalinement; 40 degrees or more. This form of shoe race permits modification of the pin-block portion of the joint by making the shaft member with a wide yoke engaging the block, in a very durable and strong arrangement. In achieving the stated objects of high strength and durability and efficiency at large disalinements I have also found it expedient to provide separate bearing members for the inner fulcra of the radius rod, and a modified type of shoe.

The new joint is very strong for its weight, and because of this and its ability to work efficiently through wide angles of disalinement and other advantages it is well suited for the wheel drive of front-wheel (or four-wheel) drive automobiles. It is also well adapted for use as a flexible coupling between the engine and the propeller shaft in boats.

In the accompanying drawing I have shown more or less diagrammatically examples of specific embodiments of machines within the purview of the invention. In the drawing, Fig. 1 is a view of the principal embodiment in vertical section, with some parts in elevation;

Fig. 2 is a view of the joint partly in elevation and partly in section corresponding to that taken along line 2—2 of Fig. 1;

Fig. 3 is a plan view of the joint of Fig. 1 with some parts in section; and

Figs. 4 and 5 are sectional views of two optional track and shoe arrangements.

Referring to Figs. 1, 2 and 3, the joint comprises a rotary shaft member 10 which in use is driven by, or drives, a wheel or some other piece of machinery (not shown). The end of the shaft member merges into a ring 11 of substantial construction, having a cylindrical race 12 with four arcuate flanges 13, of arc angle about 90 degrees, integral with the ring, arranged in pairs as shown symmetrical about an axis perpendicular to the shaft member axis. This drive ring resists shocks and distortive stresses effectively. Within the ring is a cross-shaped member or block 14 having laterally projecting portions 15 (Figs. 2 and 3) and bored at 16 for reception of a pair of shoes 17 with integral pins 18. The shoes move within the flanges 13. The bearing surface of the shoes can be conical, as shown at 20 in Fig. 2, or flat (21 in Fig. 4) or spherical (22 in Fig. 5). The various corners are advantageously rounded as shown, for example at 29 in Fig. 2.

A second shaft member 23 is provided, having a U-shaped yoke portion 24 the ends of which engage the ends of projections 15. The yoke is pinned to the block by a pin 25, keyed to the yoke at 26 and rotatable in sleeve bearings 27 in projections 15 of the block. Snap rings 28 assist in keeping the pin in position. The yoke closely surrounds annulus 11 (of Fig. 3). The annulus is relieved at 30 to permit wide disalinement of the joint.

The several parts of the joint are maintained in proper angular relation by a radius rod 31 having three spheroidal fulcrum portions or balls 32, 33 and 34. Ball 32 is seated in a bearing member 35 having a cup to receive the ball and an integral pin 36 press-fitted into pin 25 as shown. Pin 25 has a bore at 37 to facilitate pushing out member 35 in taking down the joint. Ball 33 is seated in a pair of shallow cups 38 which work in a slot 39 in the block, and ball 34 operates in a bore 40 in shaft member 10, and is urged outwardly by a cup 41 backed by a spring 42. Bore 40 is flared at 43 to permit free movement of the rod. The spacing between the centers of balls 32 and 33 is approximately the same as that between the center of ball 32 and of the pin 25. The longer the lever between balls 33 and 34, the more closely is constant velocity ratio maintained between the two shaft members at all angles of disalinement. The proportions indicated give a very nearly constant ratio even at angles as high as 40 degrees; a constancy quite sufficient for all practical purposes.

In operation, the joint can be driven by either shaft member, and the other shaft member maintains the same velocity throughout wide angles of disalinement.

The joint is very easy to take down or put together. In taking down the joint, the shaft members are alined, to bring into alinement bores 60 and 61 in block 14 and ring 11 respectively. Then a rod (not shown) is inserted through bores 60, 61 and 37 to push the cup 35 out and push the rod 31, with seats 38, clear of the block. This permits the block and shoes to be rotated until the shoe axis coincides with the axis of shaft member 10. Pin 25 is driven out, and the block and shoe assemblage simply lifted out sidewise (referring to Fig. 1). Assembly is equally simple.

If desired, in lieu of providing ring 11 with outside flanges 13 as in Figs. 1, 2 and 3, a single inner flange 46 can be provided (Fig. 4) and the shoe 47 grooved at 48 to engage the flange. Or the ring can have no flanges, the shoes 49 having outer flanges 50 engaging the walls of the ring 51; Fig. 5.

My joint is rugged and resistant to shocks and sudden stresses occurring in use. It wears very well, without getting loose or breaking, under severe conditions. Repair is simple.

The joint can be embodied in any of the usual materials for this class of apparatus; steel, brass, etc. Suitable housings can be provided when the joint is to operate under exposed conditions.

What I claim is:

1. A universal joint comprising a rotary shaft member provided with a continuous ring a diameter of which coincides with the axis of rotation of the shaft member, a block within the ring, shoe means in pivotal relation to the block along an axis through the block, and in driving engagement with the ring, a second rotary shaft member having a yoke portion and a pin attached to the ends of the yoke portion and extending through the block in pivotal relation therewith at right angles to the axis joining the shoe means, and lever means fulcrumed at a point in the first shaft member, at a point within the block, and at a point in fixed relation to said pin and lying on the axis of the second shaft member, for keeping the axis of the shoe means in bisecting relation to the axes of the two shaft members.

2. A universal joint comprising a rotary shaft member having an annular portion a diameter of which coincides with the axis of rotation of the shaft member, a block within the ring having an elongated parallel-walled slot, shoe means in pivotal relation to the block along an axis through the block at right angles to the planes of the walls of the slot and in driving engagement with the ring, a second rotary shaft member having a yoke portion and a pin attached to the ends of the yoke portion and extending through the block at right angles to the axis of the shoe means, a member having a cup seat and attached to the middle of the pin, a pair of opposed cup seats in sliding relation to the walls of the slot in the block, and a lever having three ball-like fulcrum portions seated in said cup seats and within the first shaft member on the axis of rotation thereof, for maintaining the axis of the shoe means in substantially bisecting relation to the axes of the two shaft members.

3. In a universal joint including a rotary shaft member, provided with a continuous annular portion a diameter of which coincides with the axis of rotation of the shaft member, a block centered at the center of said annular portion, and a second rotary shaft member pivotally connected to the block, the improvement comprising a pair of opposed shoes for the block, each shoe comprising an arcuate tread portion engaging the periphery of said annular portion in driving relation, and an integral pin portion extending into the block for rotation therein; and means for maintaining the rotatory axis of the shoe pin portions in substantially bisecting relation to the axes of the rotary shaft members.

4. A universal joint comprising a rotary shaft member provided with a complete ring a diameter of which coincides with the axis of rotation of the shaft member, a second rotary shaft member, a pair of shoe means in driving relation to the periphery of the ring, disposed along an axis passing through the center of the ring, and adapted to be driven by the ring, and means for pivotally attaching the shoe means to the second shaft member, for oscillation of the shoe means with respect to the second shaft member about said axis of the shoe means.

5. In a universal joint including a rotary shaft member, provided with an uninterrupted ring portion a diameter of which coincides with the axis of rotation of the shaft member, a block centered at the center of the ring portion, a second rotary shaft member in transverse pivotal relation to the block, a pair of opposed shoes in pivotal relation to the block along an axis at right angles to the axis of attachment of the second shaft member, flange means on the inner periphery of said ring portion engaging said shoes and extending over arcs of less length than that of the shoes, whereby the shoe and block assembly can be withdrawn from the ring portion by alining the axis of the shoes with said diameter of the ring portion, and lever means for keeping the axis of said shoe means in substantially bisecting relation to the axes of the two shaft members.

DANTE A. SALVETTI.